United States Patent
Goossens

(10) Patent No.: US 6,659,421 B1
(45) Date of Patent: Dec. 9, 2003

(54) ELECTROMAGNETIC VALVE

(75) Inventor: Andre F. L. Goossens, Rumst (BE)

(73) Assignee: Continental Teves AG & Co. OHG, Frankfurt (DE)

( * ) Notice: Subject to any disclaimer, the term of this patent is extended or adjusted under 35 U.S.C. 154(b) by 0 days.

(21) Appl. No.: 09/623,282

(22) PCT Filed: Feb. 27, 1999

(86) PCT No.: PCT/EP99/01276
§ 371 (c)(1),
(2), (4) Date: Feb. 23, 2001

(87) PCT Pub. No.: WO99/44872
PCT Pub. Date: Sep. 10, 1999

(30) Foreign Application Priority Data

Mar. 3, 1998 (DE) .......................................... 198 08 826
Aug. 17, 1998 (DE) .......................................... 198 37 207

(51) Int. Cl.[7] .............................................. F16K 31/06
(52) U.S. Cl. ............................. 251/129.02; 251/129.18; 303/119.2
(58) Field of Search ........................ 251/129.02, 129.18; 303/119.2

(56) References Cited

U.S. PATENT DOCUMENTS 5,460,437 A    10/1995  Hara

FOREIGN PATENT DOCUMENTS

| DE | 42 11 307 | 10/1993 |
|----|-----------|---------|
| DE | 42 21 988 | 1/1994  |
| DE | 43 30 616 | 3/1994  |
| DE | 195 04 883 | 8/1995 |
| DE | 195 29 724 | 2/1997 |
| DE | 196 04 315 | 8/1997 |
| DE | 196 04 316 | 8/1997 |
| DE | 196 04 317 | 8/1997 |
| DE | 297 13 293 | 12/1997 |
| DE | 196 35 690 | 3/1998 |
| DE | 196 35 691 | 3/1998 |
| DE | 196 35 693 | 3/1998 |
| DE | 197 11 442 | 9/1998 |
| EP | 0 679 823 | 11/1995 |

OTHER PUBLICATIONS

Search Report of the German Patent Office for Application No. 198 37 207.8.

*Primary Examiner*—Gerald A. Michalsky
(74) *Attorney, Agent, or Firm*—Rader, Fishman & Grauer PLLC

(57) ABSTRACT

The present invention relates to an electromagnetic valve, including a housing base member for attachment in a valve accommodating member, with a valve sleeve in which a magnetic armature is guided being positioned on the housing base member, with a tappet interacting with the magnetic armature and having a valve closure member that faces a valve seat member, as well as with a yoke ring that encompasses a valve coil seated on the housing base member, wherein the housing base member, the valve sleeve, the magnetic armature, the tappet, and the yoke ring are designed as preassembled subassemblies, and the valve accommodating member includes a standard type of bore for the attachment of the housing base member, and for the final assembly of the valves, the subassemblies are joined in one single direction of assembly.

21 Claims, 5 Drawing Sheets

US 6,659,421 B1

ELECTROMAGNETIC VALVE

TECHNICAL FIELD

The present invention generally relates to valves and more particularly relates to electromagnetic valves controlling fluid flow.

BACKGROUND OF THE INVENTION

DE 196 21 229 A1 discloses electromagnetic valves, each comprised of a housing base member for attachment in a valve accommodating member, with a valve sleeve in which a magnetic armature is guided projecting from the housing base member of each electromagnetic valve. Interacting with the magnetic armature in each case is a tappet which has a valve closure member that faces a valve seat member. Further, one valve coil which, among others, is passed through the valve sleeve is disposed on each housing base member. To produce the magnetic circuit necessary for operation of the electromagnetic valves, a yoke ring encompassing the valve coil contacts in an axial direction of the valves a block-shaped valve accommodating member as well as the sleeve or magnetic core area of the respective electromagnetic valve which is remote therefrom.

However, the described valve assembly suffers from the disadvantage that the magnetic circuit is closed only when the valve accommodating member is composed of a material that conducts the magnetic flow. Another shortcoming is that when a non-magnetic valve sleeve is used, the inside contour of the yoke ring must be overturned correspondingly deeply at the radial contact surface relative to the valve sleeve in order to minimize magnetic losses. Still another shortcoming is that for discharging the heat generated by the valve coil there is only a very small contact area between the yoke ring and the valve accommodating member that acts as a heat sink. Further, special measures are required in individual cases for the exact valve stroke adjustment or air gap adjustment which previously necessitated maintaining minimum possible fit or manufacturing tolerances for fixing the tappet on the magnetic armature.

U.S. Pat. No. 5,460,437 describes an electromagnetic valve which is open in its initial position and the tappet of which is directly supported on a front surface of the magnetic armature. Consequently, the position of the tappet depends on the manufacturing tolerances of valve parts that correspond with each other and, especially, on the assembly tolerances of the valve seat in the housing base member and the valve sleeve slipped upon the housing base member. In the design of the electromagnetic valve being closed in its initial position, the tappet is arranged in the magnetic armature so that the attachment of the tappet is influenced by manufacturing tolerances as well as by assembly tolerances.

An object of the present invention is to eliminate the disadvantages of the above-mentioned state of the art and to provide an electromagnetic valve which is distinguished by a particularly simple manufacture, especially by a tappet adjustment which is as independent as possible from fit tolerances, and permits universal modification in its way of functioning by simple means, if required.

DETAILED DESCRIPTION OF THE PREFERRED EMBODIMENTS

Figure 1:
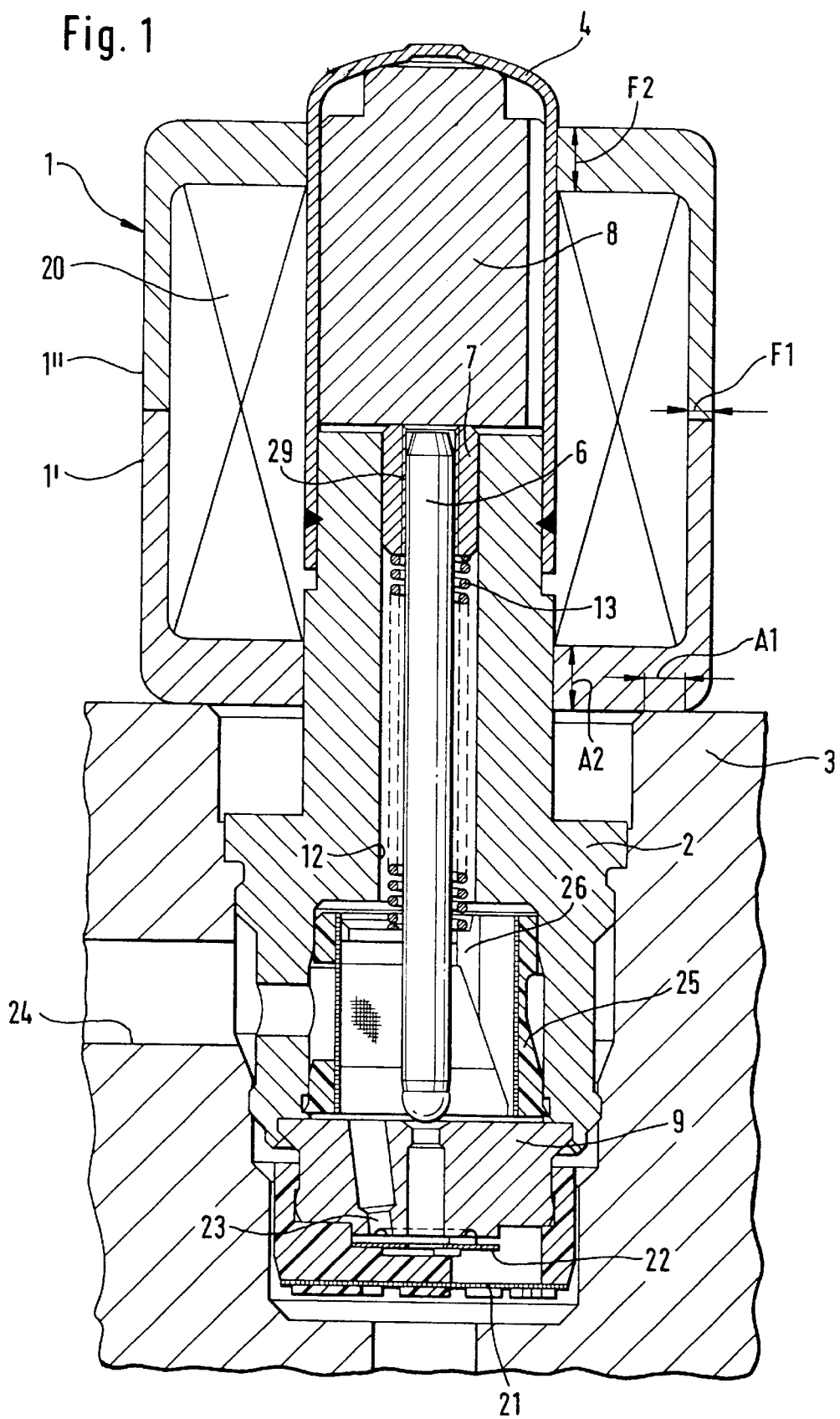
FIG. 1 is a view of an electromagnetic valve open in its deenergized initial position.

FIG. 1 shows in a considerably enlarged cross-sectional view an electromagnetic valve, which is open in its deenergized initial position, including a housing base member 2 for attachment in a block-shaped valve accommodating member 3 which, in the present embodiment, is made of a non-magnetic material that preferably consists of a light metal alloy or plastics. The housing base member 2 is configured as a rotationally symmetric component with a self-calking engagement for attachment in the valve accommodating member 3.

The result is a valve cartridge, stepped in diameter, which has a portion comparable with a bottle neck that takes over the function of a magnetic core which projects from the surface of the valve accommodating member 3. Slipped onto the bottle-neck shaped portion is a valve sleeve 4 in which a magnetic armature 8 is guided. Cooperating with the magnetic armature 8 is a tappet 6 whose spherical valve closure member faces a valve seat member 9 that is fixed at the front surface of the housing base member 2 remote from the magnetic armature 8. Further, a valve coil 20 which is encompassed by a yoke ring 1 is seated on the housing base member 2. The yoke ring 1 has a bipartite design, with a first yoke ring portion 1' that faces the housing base member 2 abutting with a first contact surface A1 on a large surface of the valve accommodating member 3 for the purpose of heat dissipation in the direction of the valve accommodating member 3. Also, the first yoke ring portion 1' includes at the level of the first contact surface A1 a second contact surface A2 which is directed radially to the housing base member 2 and establishes the necessary magnetic circuit connection. The second yoke ring portion 1" is so seated on the first yoke ring portion 1' that said's axially directed contact surface F1 abuts on the first yoke ring portion 1' also in a manner closing the magnetic circuit. Further, the second yoke ring portion 1" includes another contact surface F2 which is directed radially to the dome-shaped portion of the valve sleeve 4 and is equally provided for closing the necessary magnetic circuit. As can be seen in FIG. 1, both yoke ring portions 1', 1" point with their edges to each other in a mirror-symmetrical manner. In order that both yoke ring portions 1', 1" stay in contact with each other, the present embodiment suggests that the yoke ring 1 be injection-molded by an elastic or plastic material which, preferably, combines the yoke ring 1 with the coil 20 as a subassembly of an electronic controller so that the controller with the above-mentioned parts only needs to be mounted onto the valve sleeve 4. An alternative position-securing mechanism is provided by using a clamping plate seated on the valve dome 4 when the coil 20 and the yoke ring 1 must be fixed directly to the electromagnetic valve.

The proposed yoke ring 1 is distinguished by a particularly simple manufacture because there is no need to overturn the inside contour known from the state of the art for providing a large-surface rim abutting on the valve sleeve 4. In this arrangement, the contact surface F2 and, thus, the wall thickness of the yoke ring 1 in the area of the valve sleeve 4 can be chosen to be extremely small when the valve sleeve 4 is made of a ferritic material. When a ferritic and, thus, magnetic valve sleeve 4 is chosen, the result is automatically, due to reduced electric losses, a considerably shorter valve sleeve 4 so that smaller valve dimensions become naturally possible.

Another advantage in using the proposed two-part yoke ring 1 includes that in each case the same yoke ring 1 can be used, irrespective of whether the material employed for the valve accommodating member 3 is conductive or non-conductive in terms of the magnetic circuit. There is no need to use an additional magnetic armature earthing plate between the yoke ring 1 and the valve accommodating member 3 when the valve accommodating member 3 is made of a material which does not conduct the magnetic flow. In addition, the employment of the suggested two-part yoke ring 1 produces a large-surface abutment of the yoke ring portion 1' on the valve accommodating member 3 so that, favorably, there is ensured a direct thermal contact and, thus, the desired heat dissipation from the valve coil 20 in the direction of the valve accommodating member 3.

The previously described yoke ring 1 lends itself to universal application in different electromagnetic valve constructions, as shown in the following FIGS. 2 to 5.

Another feature which is important for the object of the present invention, making reference to the embodiment of the electromagnetic valve according to FIG. 1, is directed to the employment of a bushing 7, provided with threads 29 or like elements and fitted at the end of tappet 6 which is close to the magnetic armature 8. Bushing 7 is supported on the end surface of the magnetic armature 8 and, simultaneously, guides the tappet 6 inside the through-bore 12 in the housing base member 2. The tappet 6 along with bushing 7 represents a subassembly which can be handled independently. This is done in one preassembly step. Another preassembly group is comprised of the housing base member 2, the magnetic armature 8, and the valve sleeve 4 in the form of a subassembly which can be handled independently.

More specifically, the purpose of the bushing 7 is that of a sliding bearing bushing and an adjusting bushing because the adjustment of the valve stroke is carried out relatively easily by displacement of the tappet 6 in the frictionally fitted bushing 7 after the so-called zero stroke of the electromagnetic valve is achieved by abutment of the tappet 6 on the valve seat member 9. It is not necessary to dismantle the valve assembly composed according to the drawing in order to adjust the valve stroke because the tappet 6 inside the bushing 7 is urged farther in the direction of the magnetic armature 8, that is in abutment in the valve sleeve 4 in its initial position, by means of an adjusting mandrel inserted through the opening in the valve seat member 9. Bushing 7 as well as magnetic armature 8 are made of a material softer than that of tappet 6. The resulting advantages for the valves described herein will be explained in a summary which is subsequent to the description of the Figures.

It can also be taken from FIG. 1 that after the adjusting process is performed, a plate-type filter is clipped onto the valve seat member 9, in which filter a non-return valve plate 22 is integrated which receives an orifice bore in case of need and, hence, in dependence on the accuracy of the etching method. Normally, in the event of pressure acting from the direction of the plate-type filter 21, the non-return valve plate 22 closes the bypass channel 23 provided in the valve seat member 9 so that there is possible exclusively a hydraulic connection to the transverse channel 24 in the valve accommodating member 3 (according to the drawings) by way of the mentioned orifice in the non-return valve plate 22 and the through-bore 12 opened by the tappet 6.

Concluding the embodiment of the electromagnetic valve according to FIG. 1, the precentering of the tappet 6 by means of the ring filter 25 disposed in the area of the through-bore 12 shall still be referred to. Ring filter 25 includes several ribs 26 distributed over the periphery in the direction of tappet 6. Simultaneously, ribs 26 form a support for the resetting spring 13 which is slipped onto the tappet 6 and supported on bushing 7. Finally, welding of the valve sleeve 4 to the cartridge neck of the housing base member 2 shall be referred to, which is carried out when the desired magnetic armature air gap is adjusted by corresponding displacement of the valve sleeve 4.

Figure 2:
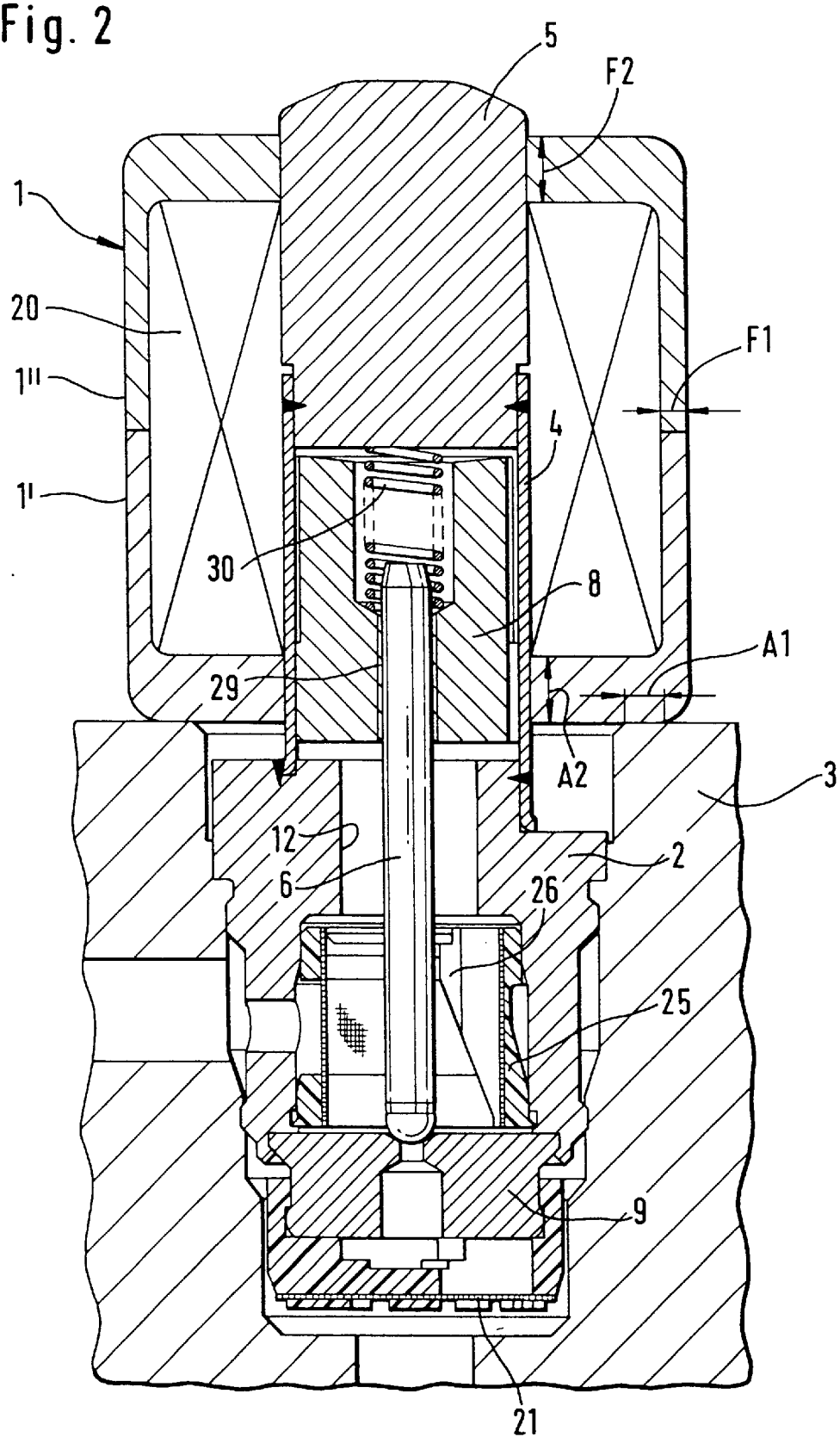
FIG. 2 is a view of an electromagnetic valve closed in its deenergized initial position.

Another application of the present invention becomes apparent from the description of the electromagnetic valve according to FIG. 2 which equally includes the described precentering of the tappet 6 by means of the ring filter 25 according to FIG. 1. The chosen structure and dimensions of the housing base member 2 is also identical to the embodiment of FIG. 1 so that only the differences will be pointed out in the following. There is no need for the bottle-neck-shaped extension of the housing base member 2, which was mentioned initially with respect to FIG. 1, when a ferritic valve sleeve 4 projects through the bottom yoke ring portion 1' until the valve accommodating member 3 and is e.g. welded there to the housing base member 3. On the front surface remote from the housing base member 2, the valve sleeve 4 is closed by a plug-shaped magnetic core 5 which is radially contacted by the second yoke ring portion 1". Between the magnetic core 5 and the housing base member 2, the magnetic armature 8 with the tappet 6 is guided along the valve sleeve 4, with the centering of the tappet 6 being substantially produced by the ribs 26 of the annular filter 25.

To manufacture the electromagnetic valve, the magnetic core 5 along with the valve sleeve 4 and the magnetic armature 8 are combined in a preassembly unit and, thus, to a subassembly which can be handled independently. The valve seat member 9 and the housing base member 2 form another preassembly unit, and the tappet 6 can be displaced within the magnetic armature 8 for the adjustment of the residual air gap. A threaded bore is provided inside the magnetic armature for this purpose. A similar principle is known from the embodiment of FIG. 1 wherein the bushing 7 is provided with a threaded bore, i.e., with threads 29, or like elements.

The adjustment of the valve stroke for the electromagnetic valve according to FIG. 2 is carried out in a simple manner by continuing to push the tappet 6 into the magnetic armature 8 after previous zero-stroke adjustment of the valve by urging the valve seat member 9 onto the tappet 6. The adjustment of the valve stroke by means of a press-on tool is easily effected by removing the valve seat member 9 because normally the opening in the valve seat member 9 is too small for passing the press-on tool through.

Figure 3:
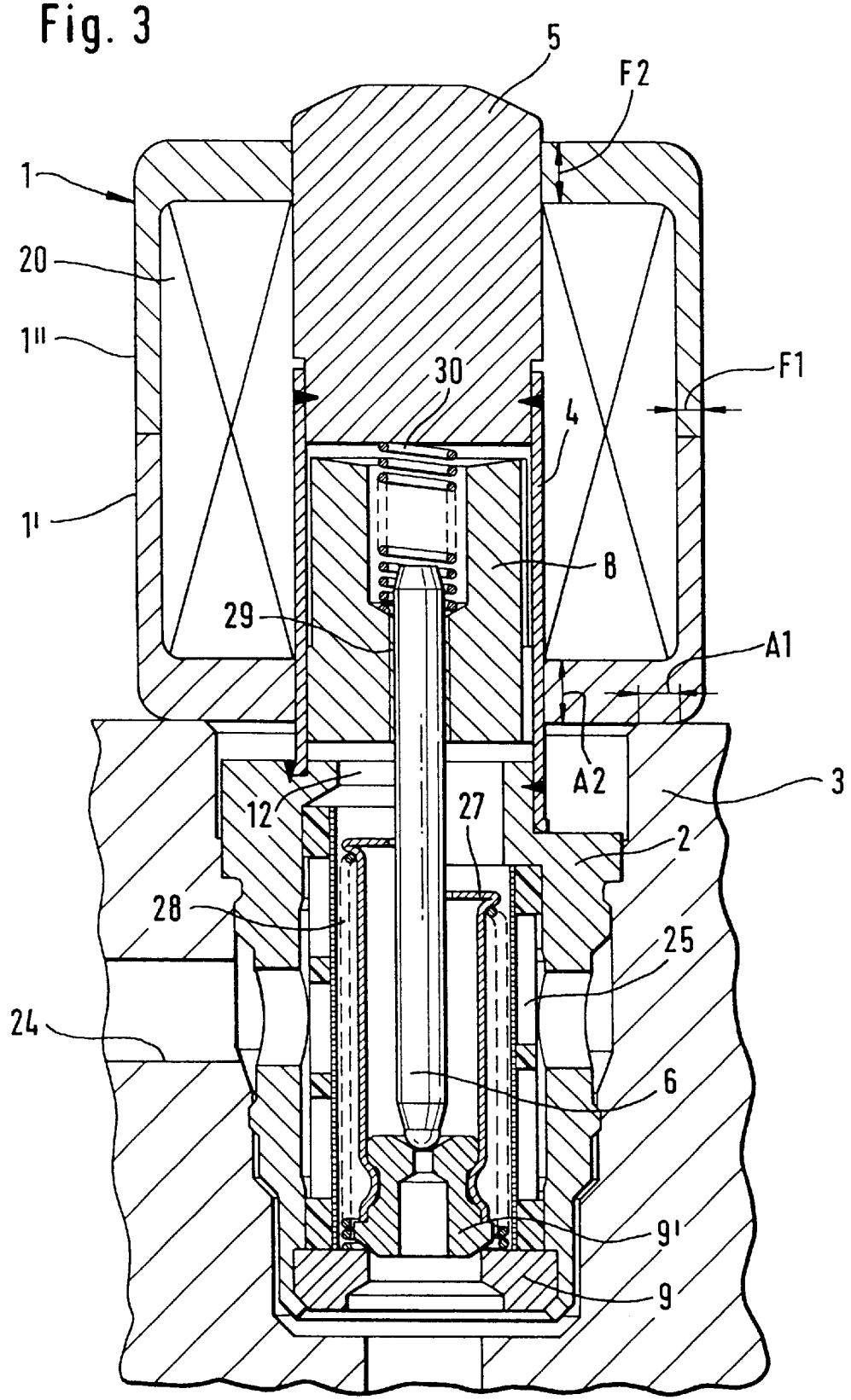
FIG. 3 is a view of a two-stage valve closed in its deenergized initial position.

Based on the preceding variation of embodiment according to FIG. 2, a variation of embodiment according to FIG. 3 shall be explained hereinbelow. The electromagnetic valve according to FIG. 3 differs from the details of electromagnetic valve 2 by the possibility of opening different passage cross-sections, as the requirement may be, by the arrangement of a valve piston 9' between the valve seat member 9 and the tappet 6 which, as shown in the drawings, is sealingly urged by the tappet 6 on the valve seat member 9 under the effect of spring 26 that is interposed between the magnetic armature 8 and the magnetic core 5. Simultaneously, the valve closure member fitted on the tappet 6 closes the relatively small-sized through-opening in the valve piston 9'. This valve piston 9' includes a bowl-shaped thin-metal part 27 on which a spring 28 is supported that acts in the opening direction of the valve piston 9'. Interposed between the spring 28 and the inside wall of the housing base member 2 is a per se known ring filter 25 which, depending on the type of fastening of the valve sleeve 4 to the housing base member 2, must be adapted to the housing shape in terms of its length and, thus, its filtering surface. The closing of the magnetic circuit as well as the subassemblies for forming the preassembly units correspond to the details described already with respect to FIG. 2, which obviates the need for a repeated description. Due to the additional arrangement of the valve piston 9' and the related details, a relatively thin housing wall thickness in the area of the valve seat member 9 is achieved, while the outside diameter of the housing base member 2 remains the same. Therefore, fastening of the valve seat member 9 in the housing base member 2 can be effected by beading which is preferably carried out by riveting or roller-burnishing. In case the valve seat member 9 is made of a non-hardened material, Laser welding may be used. Configuring the electromagnetic valve that is closed in the inactive position as a so-called two-stage valve permits, in turn, adjusting the valve stroke, without dismounting the valve seat member 9, relatively easily through the wide opening of the valve seat member 9 by means of a press-on tool, as has been described in the embodiment of FIG. 1.

Figure 4:
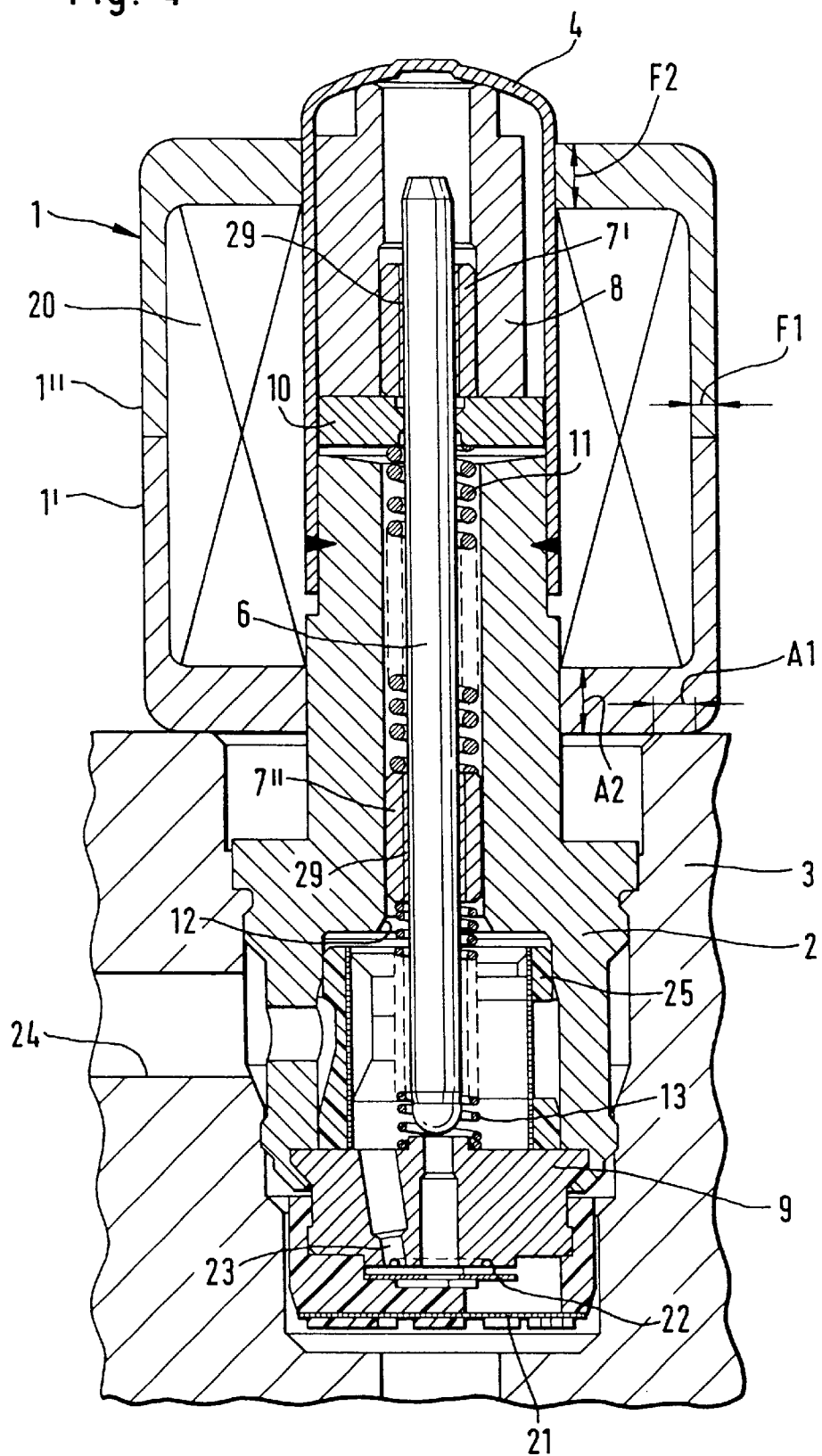
FIG. 4 is a view of an electromagnetic valve with a pressure relief valve function open in its deenergized initial position.

Similar to the embodiment of FIG. 1, FIG. 4 describes an open valve assembly which is not energized electromagnetically in the initial position and is additionally provided with a pressure-relief valve function. To this end, a first bushing 7' and a second bushing 7" are pressed onto the tappet 6, and a magnetic armature stop plate 10 and a pressure relief valve spring 11 are movably arranged between the bushings so that the above-mentioned components along with the magnetic armature 8 mounted on the magnetic armature stop plate 10 are combined to a subassembly which can be handled independently and permits preassembly. The first bushing 7' is arranged on the tappet end which extends into the magnetic armature 8. The second bushing 7" is guided remote from the first bushing 7' in a through-bore 12 of the housing base member 2. Further, a resetting spring 13 is compressed between the second bushing 7" and the valve seat member 9 in order to lift the tappet 6 from the valve seat member 9 in the electrically deenergized condition of the valve. The dome-shaped ferritic valve sleeve 4 is also welded to the housing base member 2, exactly as in all the preceding embodiments, however, with the difference that welding may only be carried out when the magnetic armature residual air gap and the valve stroke adjustment are performed.

The operation of the electromagnetic valve according to FIG. 4 differs from the illustration according to FIG. 1 in that in the electromagnetically energized closed condition of the valve, when a pressure level prevailing downstream of the valve seat member 9 is exceeded, the valve tappet 6 is lifted from the valve seat in relation to the magnetic armature 8 and in relation to the magnetic armature stop plate 10 in the opening sense in opposition to the effect of the pressure relief valve spring 11. Unhindered pressure balance in the direction of the transverse bore 24 is thereby ensured.

Inasfar as individual structural features have not been described with respect to FIG. 4, they are already comprised in the valve embodiment explained according to FIG. 1.

Figure 5:
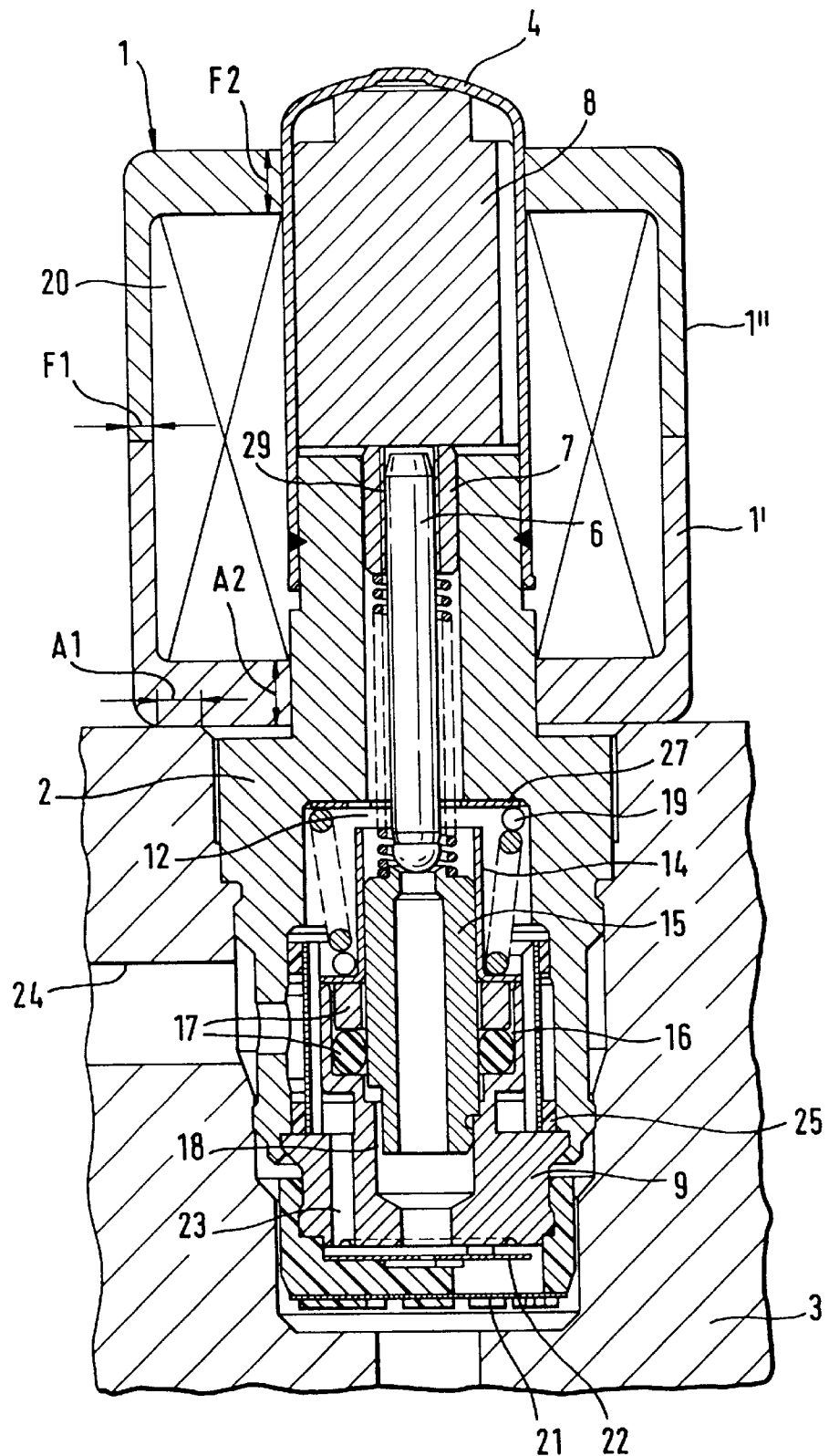
FIG. 5 is a view of the normally open electromagnetic valve mentioned in FIG. 1, extended by a noise-reducing orifice function.

The electromagnetic valve according to FIG. 5 is also identical in basic elements to the electromagnetic valve according to FIG. 1 or FIG. 4 so that only the differences of the embodiment of FIG. 5 compared to FIG. 1 shall be pointed out in the following. The major difference is to be seen in that an operating piston 14 that is actuatable in response to the differential pressure and has an orifice function is axially movably arranged in an extended portion of the through-bore 12 between the housing base member 2 and the valve seat member 9. Piston 14 is centered on a stem 15 fitted to the valve seat member 9. The sleeve-shaped stem 15 additionally receives the valve seat on which the tappet 6 abuts during electromagnetic energization. An annular groove 16 which receives a stack of gaskets 17 is provided between the stem 15 and the valve seat member 9. A pressure fluid channel 18 that leads to the pressure fluid source disposed downstream of the valve seat member 9 opens into the annular groove 16 for the hydraulic application of the stack of gaskets 17 and, thus, for the actuation of the operating piston 14. The operating piston 14 is pressed onto the stack of gaskets 17 by means of a spring 19 that is supported on the housing base member 2. To optimize the mounting space, the operating piston 14 is configured as a thin-walled sliding sleeve, with the latter sleeve, along with the stack of gaskets 17 in the valve seat member 9 and the spring 19, forming a preassembled subassembly that can be handled independently. The stack of gaskets 17 is substantially composed of an O-ring and a back ring, however, other alternatives are also possible in this regard. As has already been referred to concerning the embodiment of FIG. 1, the tappet 6 together with the bushing 7 form a preassembly unit in FIG. 5.

The main orifice which is necessary for the operation of the operating piston 14 is provided by a slot in a thin, preferably etched plate 27 which is positioned between the spring 19 and the step of the through-bore 12. The thin-walled front surface area of the operating piston 14 moves into abutment on this plate 27 when, in the closed position of the tappet 6, the pressure level in the transverse bore 24 falls below the level of the pressure fluid source disposed on the side of the plate-type filter 21. When the tappet 6 is opened again due to electromagnetic energization, the pressure fluid will propagate to the transverse channel 24 through the orifice produced by the slot in the plate 27.

Unless other details of the drawings are referred to, corresponding components in identical meaning can be taken from the preceding parts of the description of the various valve variations.

When looking upon all previously described embodiments of electromagnetic valves, subsequently, the essential features of the present invention will be listed in a condensed way. These features are the housing base member 2, the valve sleeve 4, the magnetic armature 8, the tappet 6, and the yoke ring 1 are designed as preassembled subassemblies which can be used equally for different valve operations (see FIGS. 1 to 5) and, thus, are exchangeable in groups and individually;

the valve accommodating member 3 includes a standard type of bore for the attachment of the housing base member 2, and due to identical dimensions the same housing base member 2 can be used universally for all valve constructions (see FIGS. 1 to 5);

for the final assembly of the valve, the subassembly units are joined in one single direction of assembly in conformity with the demands of automation;

the material of the magnetic armature 8 is in each case softer than that of the tappet 6, and threads 29 or grooves are indented either directly in the magnetic armature or in a separately arranged bushing 7. Advantageously, this permits the press fit and the fit tolerance to be chosen in a more generous way, without greatly changing the displacing force during pressing the tappet 6 into the magnetic armature 8 or urging it out therefrom. This favorably prevents surface damages at the press fit points, and external abrasion is equally avoided because such particles are received by the threads 29. The relation between the inside diameter of the bushing 7 or the magnetic armature 8 and the outside diameter of the tappet 6 is consequently of secondary importance for the assembly and adjusting operation of the valve. Further, the two-part yoke ring 1, the bushings 7', 7" applicable as adjusting and sliding bearing bushings and the application of exclusively ferritic valve sleeves 4 is suitable for the present invention, irrespective of the design and operation of the type of valve chosen.

The described electromagnetic valves are preferably used for wheel slip and driving dynamics control systems in automotive vehicle brake systems.

What is claimed is:

1. Electromagnetic valve, comprising:
   a housing base member,
   a valve accommodating member attached to said housing base member, said housing base member including a valve sleeve in which a magnetic armature is guided positioned on the housing base member,
   a tappet interacting with the magnetic armature and having a valve closure member that faces a valve seat member,
   a yoke ring that encompasses a valve coil seated on the housing base member, wherein the housing base member, the valve sleeve, the magnetic armature, the tappet, and the yoke ring are preassembled subassemblies, wherein the valve accommodating member includes a bore for the attachment of the housing base member, and wherein the tappet is adapted to be pushed in and out of threads or grooves arranged in a bushing or directly in the magnetic armature, with a constant tappet displacement force maintained and wherein the magnetic armature is made of a material softer than that of tappet.

2. Electromagnetic valve as claimed in claim 1, wherein an inside diameter of the bore in the magnetic armature is larger than the root diameter of the threads or grooves of arranged in the bushing or directly in the magnetic armature.

3. Electromagnetic valve as claimed in claim 1, further including a bushing secured to the tappet and supported on the magnetic armature and guided in the housing base member.

4. Electromagnetic valve as claimed in claim 3, wherein the tappet with the bushing forms a preassembled unit.

5. Electromagnetic valve as claimed in claim 1, further including a first and a second bushing pressed onto a tappet, wherein a magnetic armature stop plate and a pressure relief valve spring are arranged on the tappet so as to be movable between the first and the second bushing.

6. Electromagnetic valve as claimed in claim 5, wherein the first bushing is arranged on the tappet end which extends into the magnetic armature and is supported on the front surface of the magnetic armature stop plate opposite to the pressure relief valve spring.

7. Electromagnetic valve as claimed in claim 5, wherein the second bushing is guided in a through-bore of the housing base member, and wherein a resetting spring is compressed between the second bushing and the valve seat member and positions the electromagnetic valve in the electrically deenergized condition in the open initial position.

8. Electromagnetic valve as claimed in claim 1, wherein the yoke ring has a bipartite design having first and second yoke ring, portions, wherein said first yoke ring portion that faces the housing base member abutting with a first contact surface axially on the valve accommodating member, and wherein the first yoke ring portion with a radially directed second contact surface either abuts on the housing base member for the operation of an electromagnetic valve that is open in its deenergized initial position or abuts on the valve sleeve for the operation of an electromagnetic valve which is closed in its deenergized initial position.

9. Electromagnetic valve as claimed in claim 8, wherein said second yoke ring portion is seated on the first yoke ring portion such that an axially directed contact surface of said second yoke ring abuts against the first yoke ring portion, and wherein the second yoke ring portion with a radially directed further contact surface either abuts on the valve sleeve for the operation of an electromagnetic valve that is open in its deenergized initial position or abuts on a magnetic core that closes the valve sleeve for the operation of an electromagnetic valve which is closed in its deenergized initial position.

10. Electromagnetic valve as claimed in claim 9, wherein both yoke ring portions are compressed by injection-coating and encompassed in a position-fixed manner for closing a magnetic circuit.

11. Elecornagnetic valve as claimed in claim 1, wherein the valve sleeve that is secured to the housing base member along with the magnetic armature incorporated therein forms a subassembly which can be handled independently for the manufacture of an electromagnetic valve that is open in its deenergized initial position.

12. Electromagnetic valve as claimed in claim 1, further including a magnetic core, wherein the magnetic core along with the valve sleeve and the magnetic armature are combined in a subassembly which can be handled independently and forms a preassembly unit for the manufacture of an electromagnetic valve that is closed in its deenergized initial position.

13. Electromagnetic valve as claimed in claim 12, wherein the magnetic core is pressed into the valve sleeve and welded thereto.

14. Electromagnetic valve as claimed in claim 1, wherein the valve seat member along with the housing base member are combined to a subassembly which can be handled independently and forms a preassembly unit for an electromagnetic valve which is closed in its deenergized initial position.

15. Electromagnetic valve as claimed in claim 1, further including an operating piston, which is responsive to the differential pressure, which includes an orifice bore, is axially movably arranged in a through-bore interposed between the housing base member and the valve seat member.

16. Electromagnetic valve as claimed in claim 15, wherein the operating piston is guided on a stem of the valve seat member which aligns the valve seat concentrically relative to the tappet that includes the valve closure member.

17. Electromagnetic valve as claimed in claim 16, further including an annular groove to accommodate a stack of gaskets formed between outer surfaces of the stem and the valve seat member.

18. Electromagnetic valve as claimed in claim 17, wherein the valve seat member accommodates the stack of gaskets with the operating piston and the spring as a preassembled subassembly which can be handled independently.

19. Electromagnetic valve as claimed in claim 15, wherein a pressure fluid channel leading into the annular groove for the hydraulic application of the stack of gaskets.

20. Electromagnetic valve as claimed in claim 15, wherein the operating piston is urged against the stack of gaskets by means of a spring which is supported in the housing base member.

21. Electromagnetic valve as claimed in claim 15, wherein the operating piston is configured as a thin-wall sliding sleeve which is movable in the through-bore into abutment with a plate that includes an orifice.

* * * * *

UNITED STATES PATENT AND TRADEMARK OFFICE
CERTIFICATE OF CORRECTION

PATENT NO.    : 6,659,421 B1
DATED         : December 9, 2003
INVENTOR(S)   : Goossens, Andre It is certified that error appears in the above-identified patent and that said Letters Patent is hereby corrected as shown below:

Column 8,
Line 8, please change "yoke ring, portions," to -- yoke ring portions, --.

Signed and Sealed this

First Day of June, 2004

JON W. DUDAS
*Acting Director of the United States Patent and Trademark Office*